United States Patent [19]

Faroudja et al.

[11] Patent Number: 4,706,112
[45] Date of Patent: Nov. 10, 1987

[54] CROSS COLOR SUPPRESSION FOR QUADRATURE MODULATED COLOR TELEVISION

[75] Inventors: Yves C. Faroudja, Los Altos; Jack J. Campbell, San Francisco, both of Calif.

[73] Assignee: Faroudja Laboratories, Inc., Sunnyvale, Calif.

[21] Appl. No.: 825,105

[22] Filed: Jan. 31, 1986

[51] Int. Cl.[4] ............................................. H04N 9/78
[52] U.S. Cl. ....................................... 358/31; 358/36
[58] Field of Search .................................... 358/31, 36

[56] References Cited

U.S. PATENT DOCUMENTS

| | | | |
|---|---|---|---|
| 4,050,084 | 9/1977 | Rossi | 358/31 |
| 4,167,020 | 9/1979 | Holmes | 358/36 |
| 4,179,705 | 12/1979 | Faroudja | 358/31 |
| 4,240,105 | 12/1980 | Faroudja | 358/31 |
| 4,389,665 | 6/1983 | Nagao et al. | 358/31 |
| 4,464,686 | 8/1984 | Reitmeier | 358/36 |

OTHER PUBLICATIONS

Sasaki et al., "A Simplified Cross-Color Suppression Circuit for Color Television Receivers, *IEEE Trans. on Broadcasting and TV Receivers,* Aug. 1978, pp. 178–183.

*Primary Examiner*—John W. Shepperd
*Attorney, Agent, or Firm*—David B. Harrison

[57] ABSTRACT

A method is disclosed for reducing cross-color artifacts occuring at a diagonal luminance transition in a quadrature modulated color television signal in which a chrominance component carried on a color subcarrier has been separated from the signal by comb filter processing. The steps of the method are detecting the occurrence of a diagonal luminance transition in the signal; developing a control signal from the detected luminance transition; and, processing the chrominance component under the control of the control signal to reduce the cross-color artifact in the chrominance at the instance of the detected luminance transition.

18 Claims, 10 Drawing Figures

CROSS COLOR SUPPRESSION FOR QUADRATURE MODULATED COLOR TELEVISION

BACKGROUND OF THE INVENTION

The present invention relates to signal processing methods and apparatus for quadrature modulated color television systems and signals. More particularly, the present invention relates to the suppression of unwanted cross color artifacts incident to diagonal luminance transitions in a color television signal.

In quadrature modulated color television systems, the color information is modulated in quadrature upon a subcarrier having a frequency related to the line scan frequency in a manner which interleaves the color information about the subcarrier between energy spectra of the luminance base band signal. When the color information and the luminance information overlap, due to imperfect encoding techniques as is commonly the case, the color demodulator demodulates the overlapping high frequency luminance as a rainbow pattern which constitutes an unwanted artifact in the picture. This rainbow pattern is commonly referred to in the art as cross-color.

An article entitled "A Simplified Cross-Color Suppression Circuit for Color Television Receivers" by Sasaki, Furuhashi and Nagaoka, in *IEEE Transactions on Broadcasting and Television Receivers*, August 1978, pp. 178-183 proposed an arrangement for eliminating all chrominance information at the vicinity of a high frequency luminance transition in order to avoid the cross-color problem. These workers at the Wireless Research Laboratory of Matsushita Electric Industrial Co., Ltd., Osaka, Japan, proposed measuring the luminance spectrum at approximately 2 MHz via a filter which had no passband response at the higher color subcarrier frequency (3.58 MHz). A unidirectional pulse was developed from each picture transition, and the pulse was used to switch off the chrominance information at each detected transition, irrespective of the angle of the transition in the picture. While the solution to cross-color artifacts proposed by these workers was satisfactory for low cost television receivers, it is a brute force, crude approach, and whenever a luminance transition occurs which is unaccompanied by a concomitant chroma transition, the action of killing the chroma at the transition leaves a distinctly perceptible monochrome line at the transition, i.e., another unwanted picture artifact.

With the advent and adoption of low cost comb filters enabling recursive signal processing (typically at the line scan frequency) of the television signal at the color decoder-receiver to separate luminance and chrominance components of the signal, some but not all of the undesired cross-color artifacts were removed inherently in the comb filter processing. For example, in the instance of a vertical line appearing in the horizontally scanned picture, the summation of adjacent lines in order to separate chroma from luminance eliminates all luminance from the chroma by phase cancellation inherent in the summation process. Thus, it would be most undesirable to suppress chroma at the vicinity of a vertical line transition in a comb filter system, since no cross color is present, and since the chroma suppression adds a new, monochrome artifact to an otherwise undistorted picture signal.

Horizontal line transitions occur at the picture field rate e.g. 60 Hz. These very low frequency transitions are unaccompanied by cross-color rainbow patterns, and luminance transitions at the field rate are easily overlooked by the band pass filtering technique proposed by the Matsushita workers in the article referred to above.

While ideal comb filters perfectly separate chroma and luminance recursively line by line, and inherently eliminate in-line (vertical line) cross-color rainbow patterns, these filters do not work for transitions which are diagonal. By diagonal is meant any line transition in the picture content which is more than approximately twenty degrees from the vertical. The failure of comb filters to eliminate cross-color patterns in such picture conditions is better understood by realizing that such transitions do not occur at the same line scan time from line to line, and therefore they will not be cancelled when a present line of video is subtracted from a one line delayed line of video.

Not only do comb filters not operate effectively for cross-color elimination at diagonal luminance transitions in the picture content, they tend to introduce additional unwanted artifacts into the picture, particularly when multiple line delays are incorporated into the system. For example, if three adjacent lines are being recursively processed, the diagonal transition causes an average of three lines of unwanted crosscolor artifacts to be put out by the apparatus.

A hitherto unsolved need has arisen for a control method and apparatus for eliminating cross-color patterns from a quadrature modulated color television signal undergoing recursive processing with delay lines and summing nodes (comb filters).

SUMMARY OF THE INVENTION WITH OBJECTS

A general object of the present invention is to overcome limitations and drawbacks with prior art comb filter decoders for quadrature modulated color television systems.

A specific object is to provide improved methods and apparatus for reducing cross-color artifacts in a quadrature modulated color television decoder incorporating comb filter processing to separate luminance and chrominance components in order to reduce unwanted cross-color artifacts coincident with diagonal luminance transitions.

In accordance with the principles of the present invention a method is presented hereby for reducing cross-color artifacts occuring at a diagonal luminance transition in a quadrature modulated color television signal in which a chrominance component carried on a color subcarrier has been separated from the signal by comb filter processing. The improved method includes the steps of:

detecting the occurrence of a diagonal luminance transition in the color television signal, developing a control signal from the detected luminance transition which is within the luminance main path pass band and outside of the chroma pass band and processing the chrominance component under the control of the control signal to reduce the cross-color artifact in the chrominance at the instance of the detected luminance transition.

In one specific aspect of the invention, the steps of detecting the occurrence of a diagonal luminance transition and developing a control signal include the steps of:

delaying the signal by a predetermined integral number of horizontal line scan periods to produce a delayed signal, taking the difference between the signal and the delayed signal to develop a difference signal, band pass filtering the difference signal to eliminate low frequency picture activity occurring at the vicinity of the line scan rate and to eliminate high frequency picture activity at the vicinity of the color subcarrier frequency, and eliminating the sign of the band pass filtered difference signal to produce the control signal.

In another specific aspect of the invention, the step of eliminating the sign of the band pass filtered difference signal is followed by a step for establishing a predetermined minimum threshold value of the absolute value band pass filtered difference signal below which the control signal is not generated, typically approximately 5 IRE units.

In a further specific aspect of the invention, the control signal is a proportional value based upon detected luminance diagonal transition magnitude, and the step of processing the chrominance component comprises the step of applying the control signal to a variable threshold circuit for reducing the amplitude of the chroma picture element at the detected diagonal transition if the chroma picture element is below a threshold value controlled by the control signal.

In yet another specific aspect of the invention, the step of processing the chrominance component comprises the steps of:

delaying the chrominance component by two delays each corresponding to the color subcarrier frequency to provide a once delayed chrominance component (picture element having cross color) and a twice delayed chrominance component, averaging the chrominance component (following picture element) and the twice delayed chrominance component (preceding picture element) to yield an average chrominance component, and switching to the average component in lieu of the once delayed chrominance component in response to the presence of the control signal.

As a further specific aspect to the immediately foregoing aspect, the averaging step further includes the steps of deriving upper and lower chrominance components from the scanning lines directly above and beneath the diagonal transition having cross color, and averaging the upper, lower, preceding and following picture elements to yield the average chrominance component.

These and other objects, advantages and features of the present invention will be more fully understood and appreciated by consideration of the following detailed description of preferred embodiments, presented in conjunction with the accompanying drawing.

DETAILED DESCRIPTION OF PREFERRED EMBODIMENTS

Figure 1:
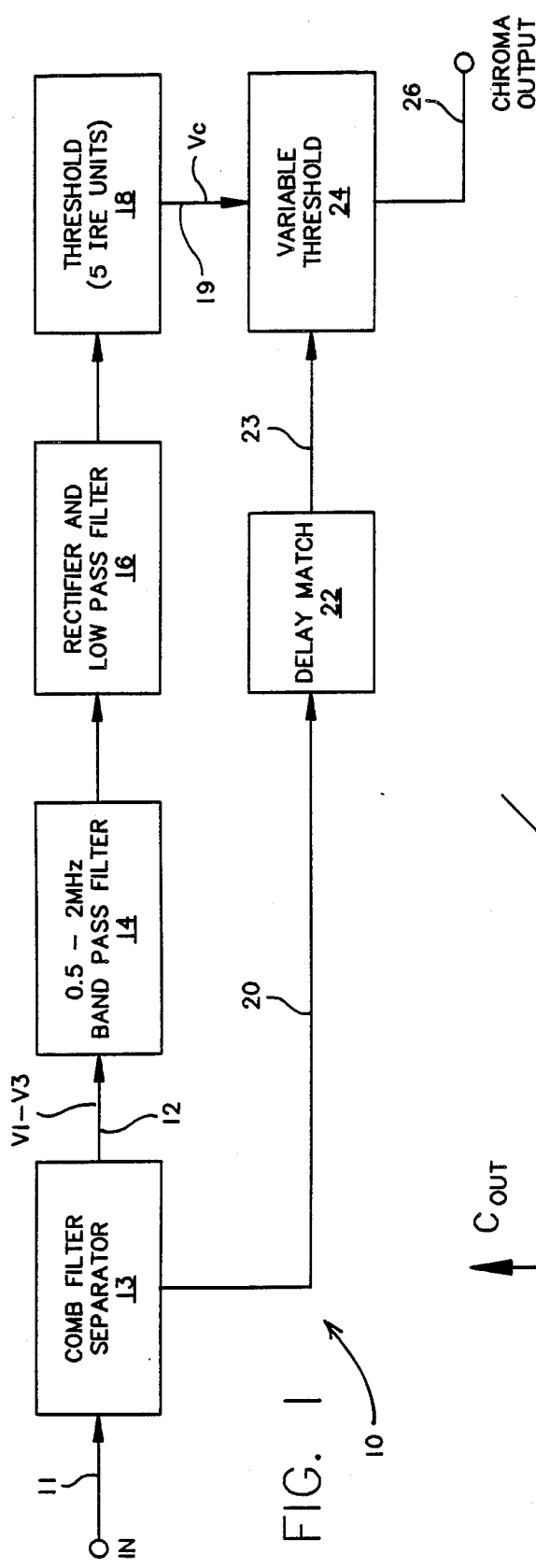
FIG. 1 is a block diagram of one preferred embodiment of a chroma processing system for quadrature modulated color television incorporating the principles of the present invention.

FIG. 1 depicts a system 10 for developing a control signal Vc for controlling processing in a chroma path. The system 10 includes an input 11, a comb filter separator 13 having a V1-V3 three line combed luminance output 12 and having a combed chrominance output line 20, a rectifier and low pass filter 16 connected to the combed luminance output 12, a band pass filter 14 connected to the filter 14, and a threshold setting circuit 18 connected to the rectifier 16. The output of the threshold circuit 18 provides a Vc control signal on a line 19. The system 10 further includes the comb filter processed chroma on the line 20, a delay matching circuit connected to delay match the signal on the line 20, and a variable threshold circuit 24. Processed chroma in which cross-color has been suppressed is provided at a chroma output 26. Each of these circuit elements will now be explained in greater detail.

The combed luminance node 12 receives a combination of main path video signals in which two delay lines in the comb filter separator 13 have been employed. A first video signal V1 is underlayed. A second video signal V2 has been delayed by one line scan period. A third video signal V3 has been delayed by two line scan periods. The input to the node 12 is V1 minus V3, and constitutes a video signal which is phase cancelled for all vertical line transitions but not for diagonal transitions.

The band pass filter 14 has a pass band between 0.5 MHz and 2 MHz, and rolls off sharply below 0.5 MHz and above 2 MHz. This filter 14 eliminates low frequency horizontal line transitions related to the line scan rate, and it eliminates all luminance in the vicinity of the color subcarrier (3.58 MHz in the NTSC format). The signal passed is narrow band and less susceptible to noise, and it is taken from a very hearty and reliable portion of the main luminance path (around 2 MHz).

The rectifier 16 eliminates the sign of the pulse signal output from the band pass filter 14, whether high level to low level, or low level to high level. A low pass filter element of the rectifier 16 eliminates any harmonics related to the full wave rectification process and any sharp transition impulse perturbations (e.g. noise).

The threshold circuit 18 functions to eliminate the Vc control signals below a predetermined amplitude level, such as about 5 IRE units for example. The threshold may vary by as much as twenty percent without adverse effect, and may be preset. The resultant control signal Vc is above a minimum level, is taken from a very reliable portion of the luminance spectrum and is narrow band in which noise and other high frequency elements have been suppressed. It is a very reliable predictor of the presence of unwanted high frequency luminance components which overlap with chroma elements to produce cross-color rainbow patterns.

Chroma information which has been separated e.g. by comb filtering, passes over the line 20 from the comb filter separator 13. It is then subjected to a delay through the matching circuit 22 so that the signal arriving at the variable threshold circuit 24 will coincide in time with the control signal Vc.

Figure 2:
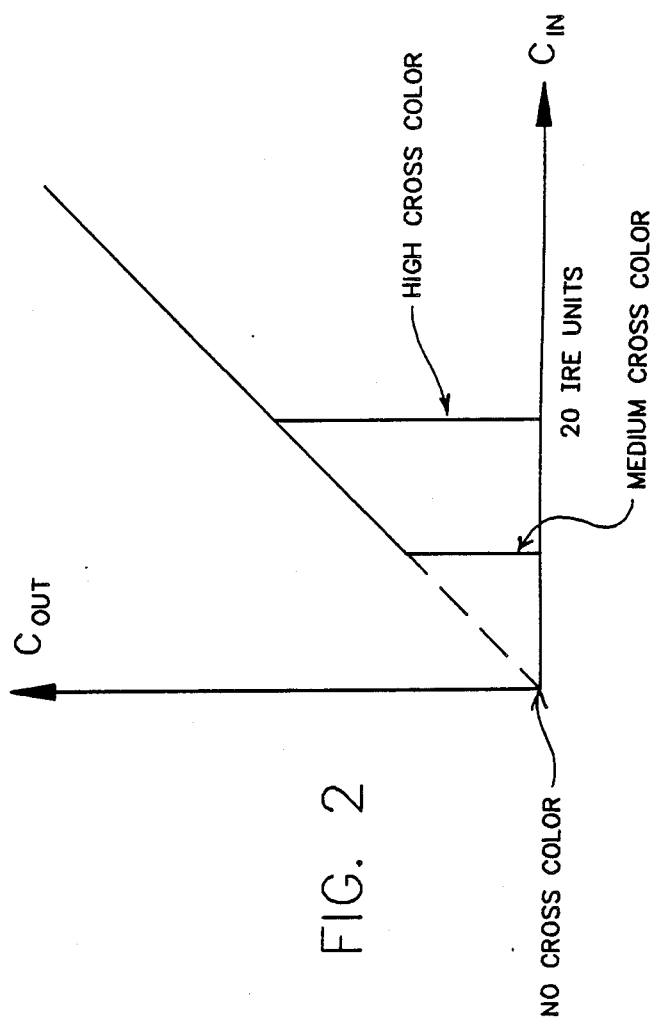
FIG. 2 is a graph of the transfer function of the chrominance path through the system depicted in FIG. 1.

The variable threshold circuit has a transfer function as graphed in FIG. 2. This circuit, which may be implemented in a variety of known ways, (see e.g. the specification relating to FIG. 3 of U.S. Pat. No. 4,179,705) refuses to pass low level chroma picture elements (pixels) up to a threshold which is set by the magnitude of the control signal Vc. For example, when no control signal Vc (cross-color) is present, the transfer funtion of the circuit 24 is linear throughout the amplitude range of incoming chroma. At high cross-color (Vc) levels, there is no chroma passed by the circuit 24 up to a certain amplitude level, for example 20 IRE units. Above 20 IRE units, the circuit 24 puts chroma out as a linear function of the chroma input. The reason for this is that in the presence of saturated color images, cross-color is virtually imperceptible to the human eye.

The system 10 fails only in the situation where low color saturation is found at a diagonal luminance transition. This situation yields a barely perceptible white edge along the diagonal transition. Instead of perceptible cross-color rainbows along the transition, a slightly desaturated picture is presented.

Figure 3:
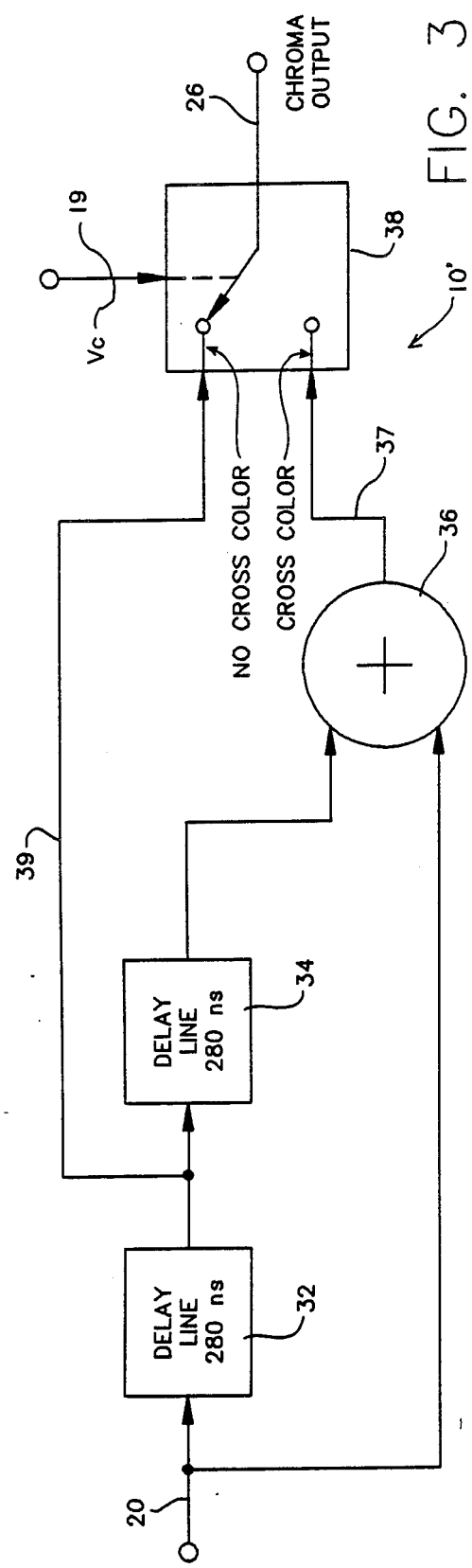
FIG. 3 is an alternative preferred embodiment for the processing circuitry of the chrominance path.
Figure 4:
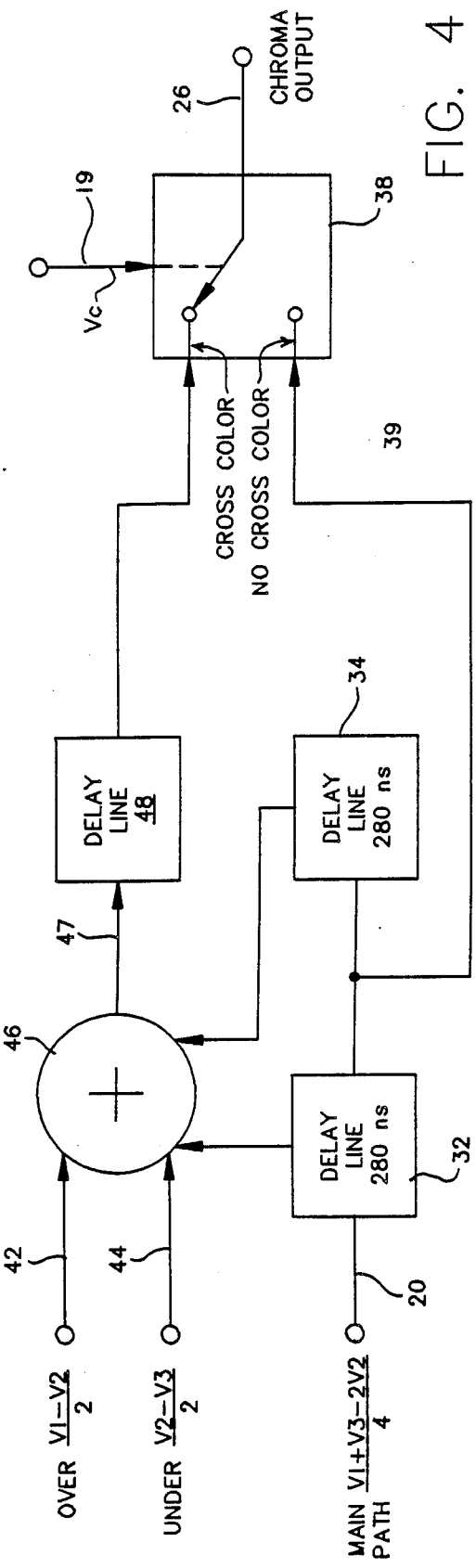
FIG. 4 is a further improvement upon the embodiment depicted in FIG. 3.

The drawback of the system 10 may be further reduced by the embodiments 10' and 10" depicted respectively in FIGS. 3 and 4 wherein like reference numerals refer to like elements of FIG. 1. In the system 10' of FIG. 3, instead of eliminating chroma at low chroma levels at the location of a diagonal transition as is done by the system 10, the chroma pixel is replaced with a pixel derived as an average from the chroma pixel occurring before and the chroma pixel occurring after the pixel to be eliminated. (The pixel is discrete in the sense that it is fixed by the color subcarrier frequency, 3.58 MHz in the NTSC format). Thus, combed chroma enters the system 10' at an input 20. A delay line 32 is followed by a delay line 34. Each line 32, 34 has a delay corresponding to the color subcarrier frequency (280 nanoseconds in the case of the NTSC subcarrier). The input 20 and the output from the delay 34 are combined in a summing circuit 36 which puts out a value corresponding to the average thereof on a line 37. A switching circuit 38 selects the average on the line 37 when it is actuated by the control signal Vc on the line 19. At all other times, the unaveraged chroma value put out from the delay line 32 on a line 39 is selected for the chroma output 26. The chroma averaging process may produce a slightly blurred chroma transition which is barely perceptible, if at all.

A better prediction of the actual chroma along the diagonal luminance transition may be achieved at greater complexity and cost by adopting the FIG. 4 approach. Therein, the system 10" isolates color pixels above, below and on each side of the pixel in question. These four pixels are then averaged together, and the composite value is substituted in place of the pixel giving rise to cross-color.

In this system 10" a combed chroma signal ½(V1−V2) on a line 42, and a combed chroma signal ½(V2−V3) on a line 44 enter a summing junction 46. Also entering the junction 46 are signals from the delay lines 32 and 34 which are in a main chroma path derived as ¼(V1+V3−2V2). The output from junction 46 on a line 47 is delay matched in a delay 48 and then enters the control switch 38. The switch 38 normally selects main path chroma on the line 39 as delayed by the 280 ns delay line 32. When the control signal Vc is present, the switch 38 switches to the four chroma pixel average on the line 47.

Figure 4A:
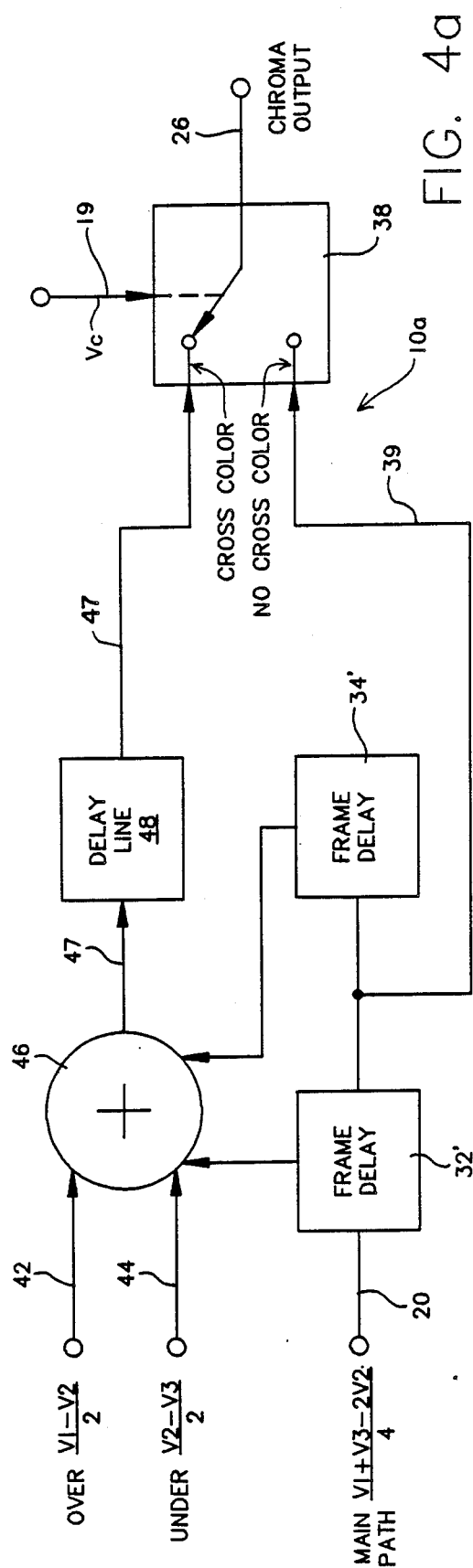
FIG. 4a is a modified version of the FIG. 4 improvement in which information from the vertical and time domains is combined to provide a replacement for a chroma picture element interval characterized by the presence of cross-color.

The system 10A depicted in FIG. 4a is basically the same architecturally as the system 10" depicted in FIG. 4, except that the 280 ns picture element delays 32 and 34 have been replaced by two frame delays 32' and 34'. In the system 10A, a combination of four adjacent picture elements, i.e. those located above and below (vertical domain) and those spatially co-located with the picture element to be replaced but separated in time by frame period (time domain) replaces the chroma pixel having cross-color.

Figure 5:
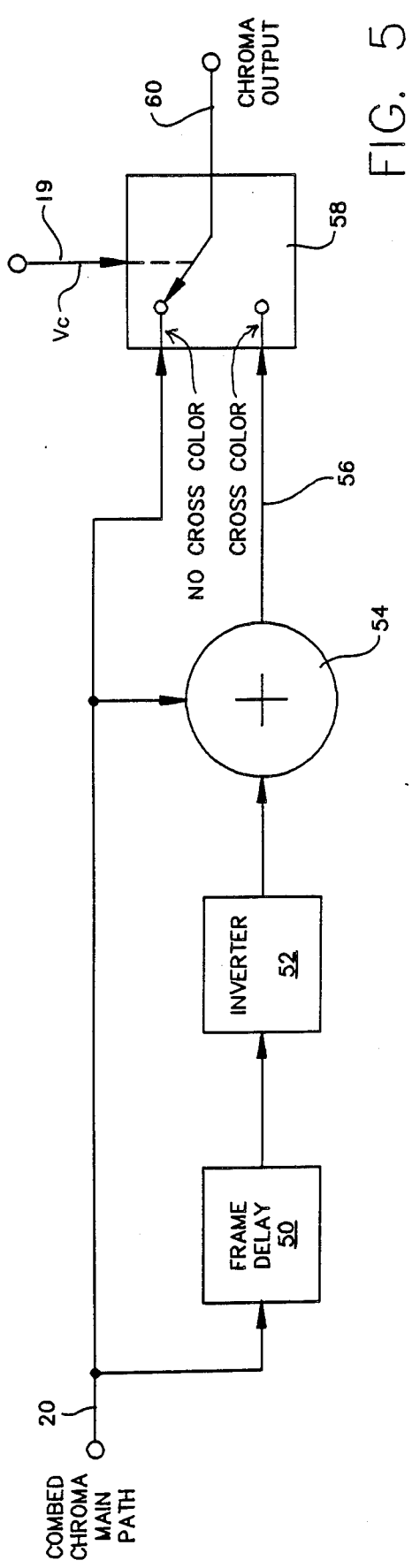
FIG. 5 is another preferred embodiment for the processing circuitry of the chrominance path.

In the approach depicted in FIG. 5, time domain averaging of chroma components over one frame period (or a multiplicity of frame periods) provides further improvements in signal processing. As chroma is phase inverted from frame to frame, averaging of chroma components from frame to frame will eliminate cross-color generated by diagonal transitions which are in phase opposition, by reference to chroma, every other frame only. Combed chroma on the line 20 is delayed by one frame-by-frame delay 50, then inverted by an inverter 52 and averaged with the undelayed combed chroma on the line 20 by operation of an adder 54. The averaged signal put out by the adder 54 on a line 56 is selected in lieu of main path combed chroma on the line 20 by action of a switch 58 when a diagonal transition is present. The switch 58 is controlled by the control signal Vc on the line 19. Combed chroma in which cross-color has been reduced is put out at an output 60.

Figure 6:
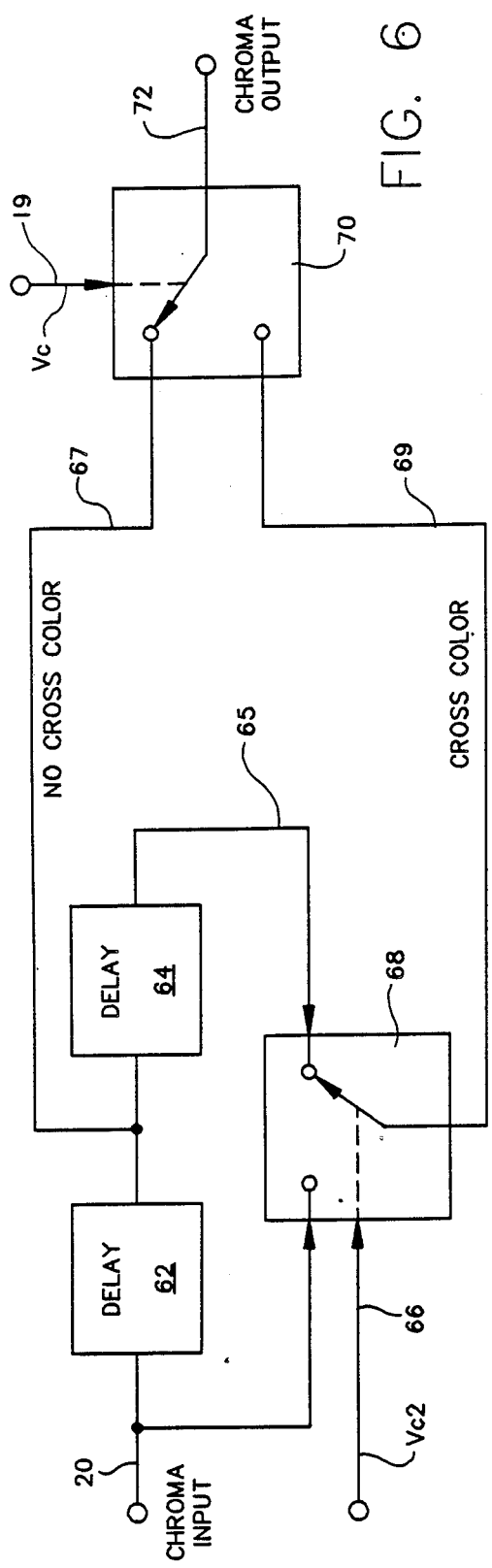
FIG. 6a is yet one more preferred embodiment for the processing circuitry of the chrominance path.
FIG. 6b is a block diagram of a slight modification of the FIG. 1 circuit enabling generation of control values Vc and Vc2 which may be used to control operation of the FIG. 6a preferred embodiment.
FIG. 6c is a graph which aids understanding of the operation of the FIG. 6b circuitry.

Another preferred embodiment is set forth in FIG. 6a. Therein, the combed chroma on the line 20 is delayed twice by the same amount through two delays 62 and 64. A control signal Vc2 on a line 66 operates a switch 68 to select either the chroma input 20 or the twice delayed chroma on a line 65 during a luminance transition. The output signal present on an output line 69 is either: twice delayed chroma on the line 65 occurring prior to the luminance transition, or chroma at the input 20 occurring after the luminance transition.

The control signal Vc2 is generated by luminance transitions or chroma transitions in the absence of luminance transitions. The control signal Vc on the line 19 causes selection of either the once delayed chroma on a line 67 in absence of cross-color, or the switched chroma on the line 69 when cross-color is present by the same switching mechanism as described in previous embodiments hereof.

Figure 6B:
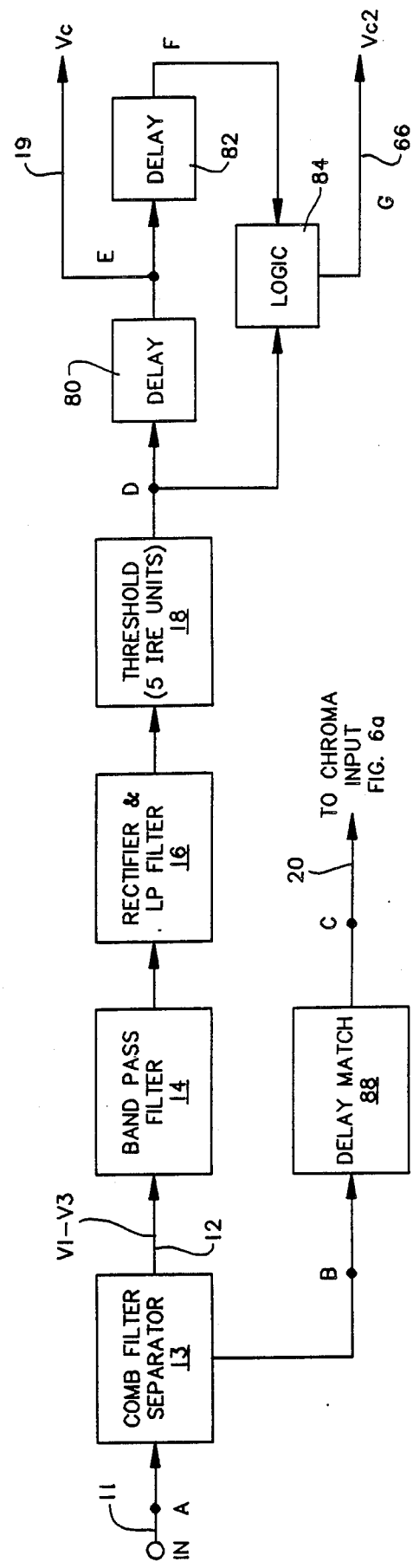

FIG. 6b illustrates a circuit for generating the Vc and Vc2 control signals employed to operate the switches 70 and 68 respectively in FIG. 6a. The circuit therein involves a slight addition of elements to the control circuit depicted in FIG. 1. Color video enters the FIG. 6b control circuit at an input node 11. The signal is separated into luminance (V1−V3) on a line 12 and into chrominance by conventional comb filter processing techniques. The luminance is band pass filtered by a filter 14, rectified and low pass filtered by a rectifier and low pass filter 16 and passed through a threshold circuit 18, as with the FIG. 1 circuit. In FIG. 1, the output line 19 provided the Vc control signal directly. In the FIG. 6b control circuit embodiment, in order to generate the proper logic signals several delays 80 and 82 are employed, together with a simple logic circuit 84. Vc is derived on the line 19 leading from a common node between the delays 80 and 82, while Vc2 is derived in the logic circuit 84 and put out on the line 68. The combed chroma signal is delayed in a delay match circuit 88 and put out on the line 20 to the chroma input node of the FIG. 6a circuit.

Figure 6C:
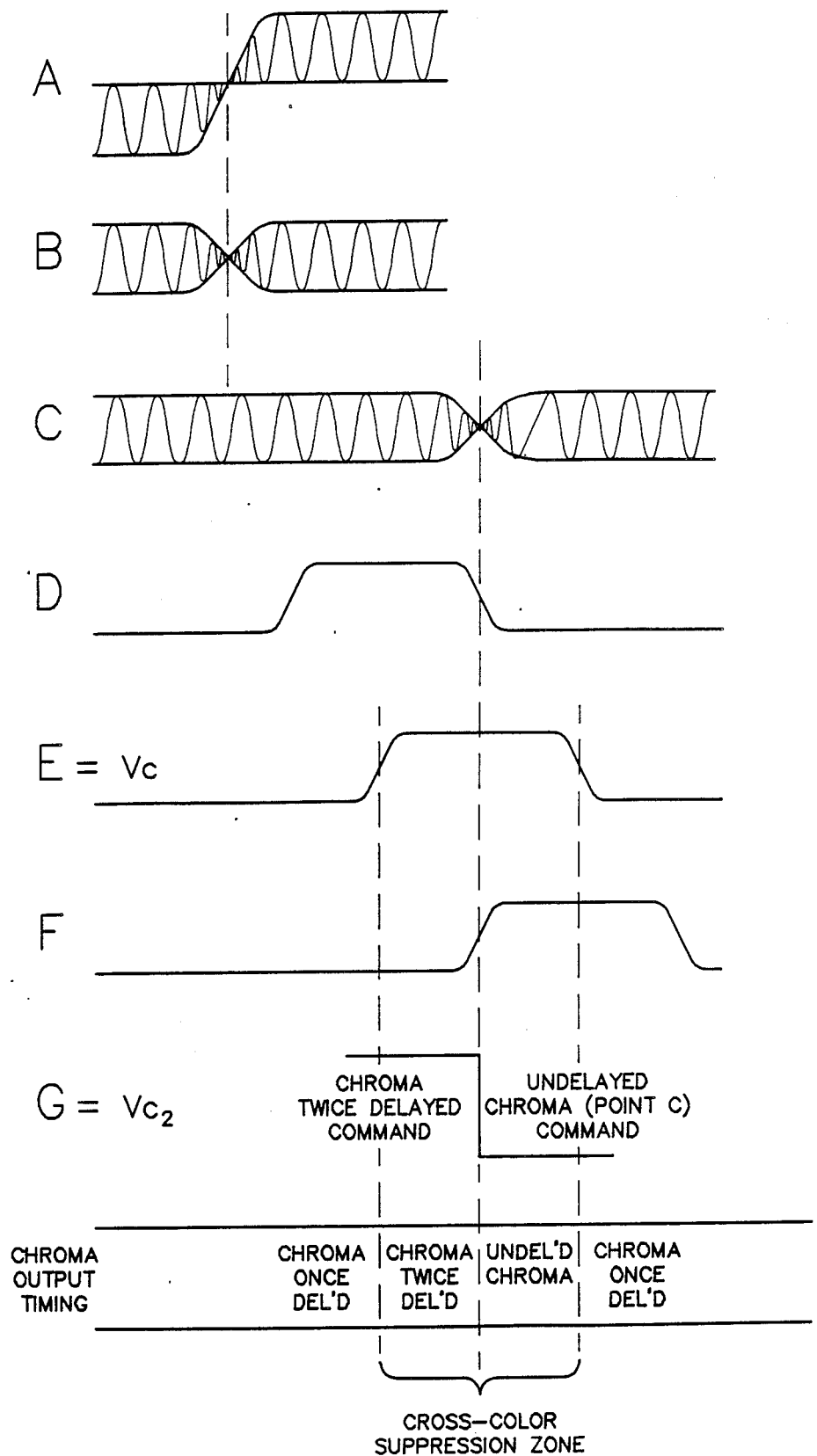

With reference to FIG. 6c, a luminance transition accompanied by a simultaneous chrominance transition is depicted in graph A. The comb filter separated chroma component at the transition is graphed in graph B. The delay added by the delay match 88 is graphed at graph C. Meanwhile the threshold control signal (above 5 IRE units) is graphed as graph D. The delay match 88 causes the threshold control signal put out by the threshold circuit 18 to occur just before the chroma transition graphed at graph C. The delay added by the delay 80 provides a Vc control having a duration which spans a time interval e.g. corresponding to the immediately preceding pixel and the immediately following pixel in the spatial domain. This Vc signal thereby represents a cross-color suppression zone which embraces the transition otherwise giving rise to cross-color artifacts, as shown at graph H. The second delay 82 generates a signal, graphed by graph E, which occurs immediately following the chroma transition graphed at graph C. The logic circuit 84 responds to the signals D and F by generating a switching signal timed to coincide with the transition graphed at graph C.

Thus, Vc operates the FIG. 6a circuit to switch to the line 69 during the cross color suppression zone. During that switching interval, the first portion leading up to the transition is the twice delayed chroma put out from the delay 64, while the second portion immediately switched to by the switch 68 is the undelayed chroma on the input line 20. After the interval established by Vc has passed, the switch 70 returns to the no cross color position.

Figure 7:
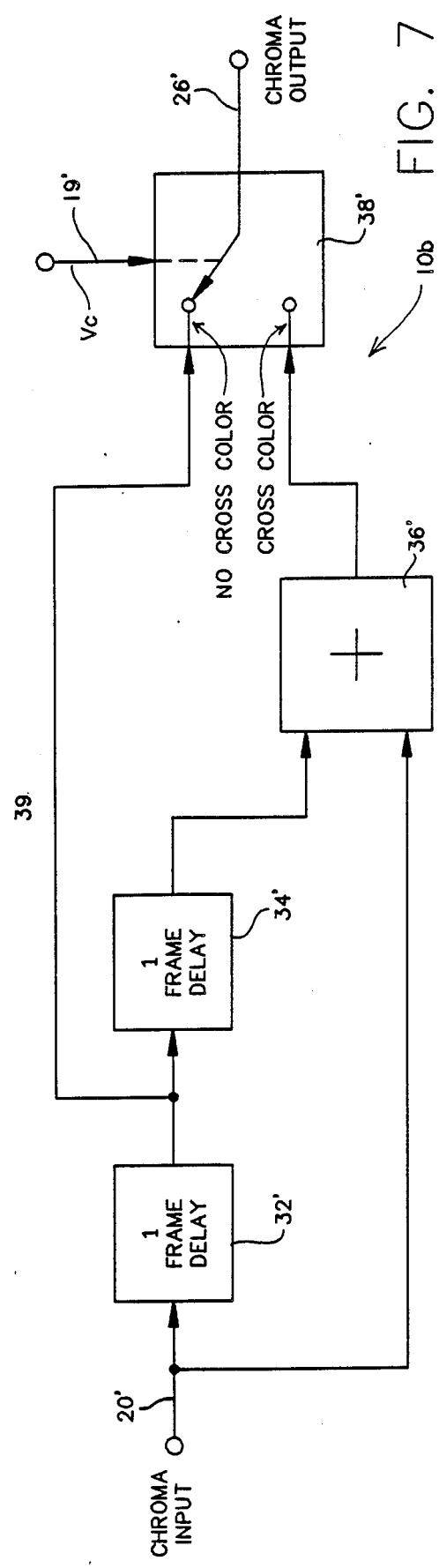
FIG. 7 is an alternative preferred embodiment for frame delay processing circuitry of the chrominance path.

FIG. 7 illustrates an embodiment 10B of the present invention for eliminating cross-color artifacts from chroma in the time domain. Other than the substitution of frame delays 32' and 34' for pixel delays 32 and 34, this FIG. 7 circuit operates substantially similarly to the circuit 10' depicted in FIG. 3.

To those skilled in the art to which this invention pertains, many widely varying embodiments and applications will be apparent. The embodiments and examples presented herein are by way of example and should not be construed as limiting the the invention, the scope of which is defined by the following claims.

We claim:

1. A method for reducing cross-color artifacts occurring at a diagonal luminance transition in a quadrature modulated color television signal in which a chrominance component carried on a color subcarrier has been separated from the signal by comb filter processing, including the steps of
   detecting the occurrence of a diagonal luminance transition in the signal,
   developing a control signal from a mid-band portion of the luminance spectrum of the detected luminance transition lying effectively outside of the chrominance pass band and
   processing the chrominance component under the control of the control signal to reduce the cross-color artifacts in the chrominance component at the instance of the detected luminance transition.

2. The method set forth in claim 1 wherein the step of processing the main path chroma component comprises the step of reducing the amplitude of the chroma picture element at the detected diagonal transition.

3. The method set forth in claim 2 wherein the step of reducing the amplitude of the chroma picture element of the detected diagonal transition occurs only if the chroma picture element is below a threshold value.

4. The method set forth in claim 3 wherein said threshold value is controlled by the control signal.

5. The method set forth in claim 1 wherein the control signal is a proportional value based upon detected luminance diagonal transition magnitude, and wherein the step of processing the chrominance component comprises the step of applying the control signal to a variable threshold circuit for reducing the amplitude of the chroma picture element at the detected diagonal transition if the chroma picture element is below a threshold value controlled by the control signal.

6. The method set forth in claim 1 wherein the step of processing the chroma component comprises the step of replacing the chroma picture element by a combination of adjacent chroma picture elements at the detected diagonal transition.

7. The method set forth in claim 6 when said adjacent chroma picture elements are in the horizontal domain.

8. The method set forth in claim 6 when said adjacent chroma picture elements are in the vertical domain.

9. The method set forth in claim 6 when said adjacent chroma picture elements are delayed as a function of the picture frame scan rate.

10. The method set forth in claim 6 when said adjacent chroma picture elements are taken from at least two of the horizontal, vertical and frame time domains.

11. The method set forth in claim 6 wherein the averaging step further includes the steps of deriving upper and lower chrominance components from the scanning lines directly above and beneath the diagonal transition having cross color, and averaging the upper, lower, preceding and following picture elements to yield the average chrominance component.

12. The method set forth in claim 6 when said combination includes as one of its constituents the chroma picture element to be replaced.

13. The method set forth in claim 1 wherein the step of processing the chrominance component comprises the steps of:
   delaying the chrominance component by two delays, each corresponding to a function of the color subcarrier period to provide a once delayed chrominance component picture element and a twice delayed chrominance component,
   averaging said chrominance component and said twice delayed chrominance component to yield an average chrominance component without cross color, and
   switching to the average chrominance component in lieu of the once delayed chrominance component with cross color in response to the presence of the control signal.

14. The method set forth in claim 1 wherein the step of processing the chrominance component comprises the steps of
   delaying the chrominance component by a delay equal to a television frame to obtain a frame-delayed chrominance component,
   averaging said chrominance component and said frame-delayed chrominance component to yield a time-averaged chrominance component and
   switching to the time-averaged chrominance component in lieu of said chrominance component in response to the presence of the control signal.

15. The method set forth in claim 1 wherein the step of processing the chrominance component comprise the steps of:
   delaying the chrominance component by two separate delays in tandem to provide a once-delayed chrominance component and a twice delayed chrominance component,
   generating a switching signal at the instance of and over the duration of said luminance diagonal transition, said switching signal being provided by detecting at least one of a luminance transition signal, a chroma transition signal, and a combination of luminance transition and chroma transition signals,
   switching in response to said switching signal to the twice delayed chrominance component prior to occurrence of a said detected luminance diagonal transition in real time,
   switching in response to said switching signal to said undelayed chrominance component after the occurrence of said detected luminance diagonal transition,
   putting out said twice delayed chrominance component and said undelayed chrominance component as a processed chrominance component, and
   switching to the processed chrominance component in lieu of the once-delayed chrominance component in response to the presence of the control signal.

16. A method for reducing cross-color artifacts occurring at a diagonal luminance transition in a quadrature modulated color television signal in which a chrominance component carried on a color subcarrier has been separated from the signal by comb filter processing, including the steps of
   detecting the occurrence of a diagonal luminance transition in the signal,
   developing a control signal from a mid-band portion of the luminance spectrum of the detected luminance transition lying effectively outside of the chrominance pass band by
   delaying the signal by a predetermined number of horizontal line scan periods to produce a delayed signal,
   taking the difference between the signal and the delayed signal to develop a difference signal,
   bandpass filtering the difference signal to eliminate low frequency picture activity occurring at the vicinity of the line scan rate and to eliminate high frequency picture activity at the vicinity of the color subcarrier frequency, and
   eliminating the sign of the band pass filtered difference signal to produce the control signal; and
   processing the chrominance component under the control of the control signal to reduce the cross-color artifacts in the chrominance component at the instance of the detected luminance transition.

17. The method set forth in claim 16 wherein the step of eliminating the sign of the band pass filtered difference signal is followed by a step for establishing a predetermined minimum threshold value of the absolute value band pass filtered difference signal below which the control signal is not generated.

18. The method set forth in claim 17 wherein the predetermined minimum threshold value is approximately 5 IRE units.

* * * * *